United States Patent
Hutler et al.

(10) Patent No.: US 7,403,566 B2
(45) Date of Patent: Jul. 22, 2008

(54) SYSTEM, COMPUTER PROGRAM PRODUCT, AND METHOD FOR TRANSMITTING COMPRESSED SCREEN IMAGES FROM ONE COMPUTER TO ANOTHER OR MANY COMPUTERS

(75) Inventors: Kevin Hutler, Foresthill, CA (US); Richard D. Bowers, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 890 days.

(21) Appl. No.: 10/453,044

(22) Filed: Jun. 3, 2003

(65) Prior Publication Data

US 2004/0249980 A1    Dec. 9, 2004

(51) Int. Cl.
*H04B 1/66* (2006.01)
*H04N 7/12* (2006.01)
*H04N 11/02* (2006.01)
*H04N 11/04* (2006.01)

(52) U.S. Cl. .................. 375/240.25; 375/240.26; 709/204; 709/205; 709/206

(58) Field of Classification Search ............ 375/240.25, 375/240.26
See application file for complete search history.

(56) References Cited

U.S. PATENT DOCUMENTS

| | | | |
|---|---|---|---|
| 5,982,936 A * | 11/1999 | Tucker et al. | 382/233 |
| 5,991,276 A * | 11/1999 | Yamamoto | 370/260 |
| 6,683,987 B1 * | 1/2004 | Sugahara | 382/235 |
| 2001/0031004 A1 * | 10/2001 | Kim et al. | 375/240.16 |
| 2002/0009149 A1 * | 1/2002 | Rodriguez et al. | 375/240.25 |
| 2002/0061065 A1 * | 5/2002 | Moore | 375/240.13 |
| 2002/0111775 A1 * | 8/2002 | Dorough | 702/188 |
| 2003/0041183 A1 * | 2/2003 | LaPierre et al. | 710/1 |
| 2004/0249980 A1 * | 12/2004 | Hutler et al. | 709/247 |

FOREIGN PATENT DOCUMENTS

| | | | |
|---|---|---|---|
| EP | 838956 A2 * | 4/1998 | |
| GB | 2322991 A * | 9/1998 | |

OTHER PUBLICATIONS wxPython, CHANGES.txt, Sep. 17, 2000.*
Paul Croft, Subclassing Made Easy, Dec. 20, 2002, Microtek Solutions.*

* cited by examiner

*Primary Examiner*—Bunjob Jaroenchonwanit
*Assistant Examiner*—Brian P Whipple

(57) ABSTRACT

A computer system transmits images of its display screen over a low bandwidth line. The computer system operates under a display control system, where screen paint or equivalent messages are used to write messages to portions of a display screen of the computer system. In a particular embodiment, the display control system is a windowing system such as is known in the art. The screen is divided into multiple macroblocks. The screen paint messages are intercepted and decoded to determine altered macroblocks on the display. A changed-blocks table is constructed and marked according to altered macroblocks. An additional thread reads the changed-blocks table and encodes macroblocks as predicted blocks or initial blocks, depending upon the amount of change, and transmits them to a decode and display system. Periodically each macroblock in the screen top is marked as changed and requiring an initial block transmission in the changed-blocks table.

15 Claims, 2 Drawing Sheets

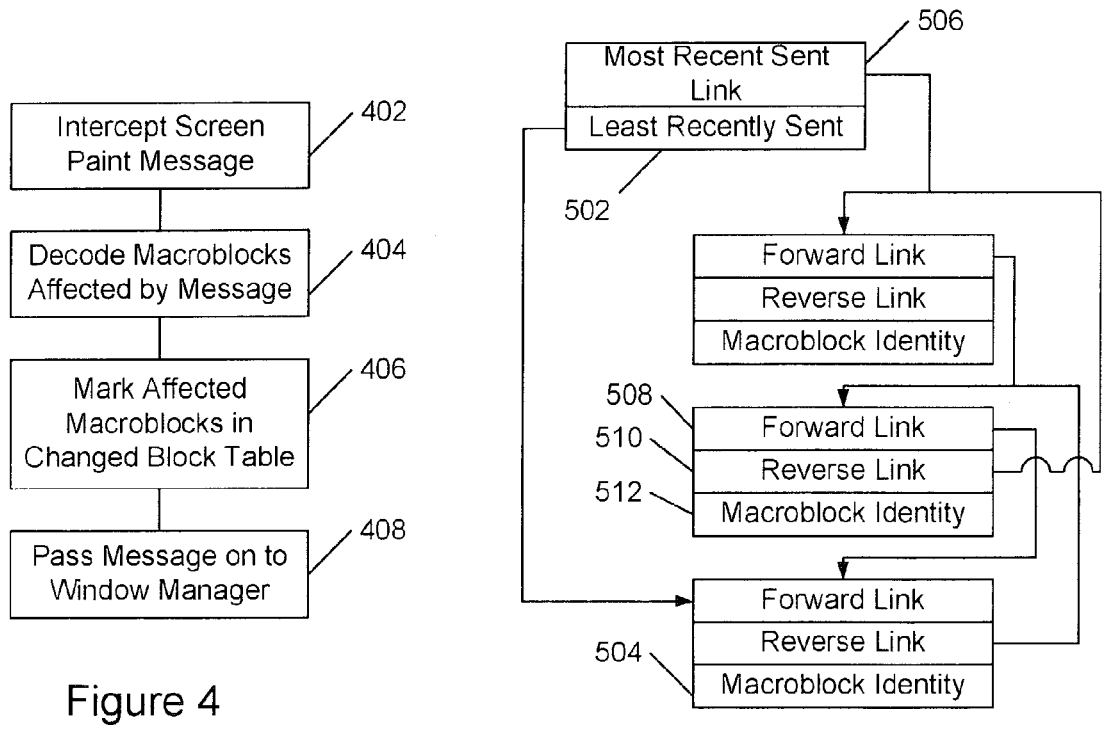
Figure 3
Figure 4
Figure 5
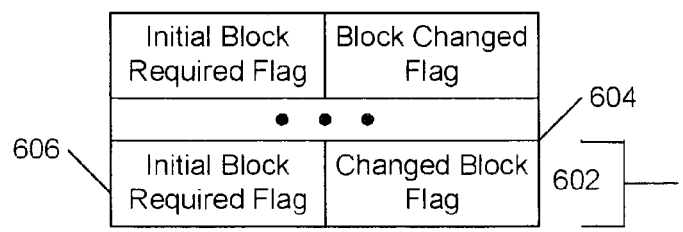
Figure 6

SYSTEM, COMPUTER PROGRAM PRODUCT, AND METHOD FOR TRANSMITTING COMPRESSED SCREEN IMAGES FROM ONE COMPUTER TO ANOTHER OR MANY COMPUTERS

FIELD

The present document relates to the field video conferencing. In particular, it relates to a system, computer program product, and method for transmitting a compressed image of a computer display to a remote location. The computer display may incorporate video images.

BACKGROUND

Video Compression

Video is typically captured as a sequence of frames, where each frame is—before compression—a separate still image. Uncompressed video requires considerable bandwidth for transmission because each pixel of each frame must be transmitted; this can require very expensive transmission facilities. It is therefore desirable to compress video for transmission from a compressing system to a decompressing system.

Many common video compression algorithms, including many variants of Motion Picture Experts Group (MPEG) video compression, operate by breaking a video stream into a sequence of I and P frames.

An initial frame (I-frame), sometimes also known as a key frame, is a full image that has been captured compressed and transmitted by the first computer. A predicted frame (P-frame), is an image that has been compressed by determining differences between the current frame and a prior frame held in a frame buffer—typically an I-frame or a previous P-frame—of the video, these differences are then compressed, coded and transmitted. Since only a small portion of each image changes from frame to frame in a typical video sequence, P-frames typically can be encoded with far fewer bits than an I-frame.

A bidirectionally predicted frame (B-frame) is an image that is compressed by encoding differences from both a previous and a following frame. Some variants of the MPEG standard call for compressing video into a repeating sequence of I-frames followed by a sequence of alternating B- and P-frames.

Encoded B- and P-frames are typically much smaller than encoded I frames. A video stream compressed as a sequence of I-, P- and B-frames therefore typically requires far fewer bits than does a video compressed as a sequence of I-frames of similar quality.

Video Conferencing

Video conferencing has become increasingly popular in recent years for both educational and business applications. Video conferencing generally requires that both a video and an audio stream be transmitted in realtime between locations that can be many miles apart. Both unidirectional and bidirectional video conferencing systems are known. Since high-bandwidth connections are not always available between locations at reasonable cost, it is desirable to minimize the bandwidth required for video transmission. It is therefore desirable to minimize the number of I-frames that must be transmitted.

During decompression of a video, should a frame be corrupted, such as when packets are dropped during transmission or when a new viewer first joins a videoconference and has no prior frame; following B- and P-frames will be corrupted. Further, this corruption will continue until the corrupt data is replaced in the frame buffer, such as when an I-frame is received.

Video conferencing systems are known wherein the video stream is examined for points where large differences occur between frames, such as at scene changes, and I-frames are transmitted only at these points. With systems of this type, I-frames may occur rarely, they may be separated by hundreds of B- and P-frames. Since video conference transmissions are also often transmitted at low frame rates, image corruption may persist for tens of seconds.

Since an I-frame requires many more bits than a typical B- or P-frame, transmission of I-frames into a low-bitrate realtime video transmission causes a burst of data needing transmission. These bursts can interfere with transmission, causing interference with audio, as well as causing visible artifacts such as momentary freezing of parts of the screen. It is desirable to minimize these bursts while transmitting video.

In "Robust H.263 Video coding for Transmission over the Internet." Willebeek-LeMair, et. al., *INFOCOM* 1998: 225-232 available at http://www.ieee-infocom.org/1998/papers/02c_4.pdf, it is proposed that, instead of transmitting complete I-frames, a sequence of macroblocks (herein I-blocks) be transmitted instead. The H.263 referenced in this title is the H.263 specification for transmission of compressed video in videoconferencing applications published by the International Telecommunications Union. These I-blocks represent encoding a portion of a frame in full, while remaining portions of the frame are typically encoded as P-blocks based upon previous frames. Successive I-blocks encode differing portions of the frame in full, such that as successive frames are transmitted an entire frame buffer is updated. In Willebeek-LeMair, it is proposed that I-blocks be inserted into a video stream based upon their impact on future frames. The mechanism of Willebeek-LeMair is applicable to unidirectional videoconference systems. The system of Willebeek-LeMair poses difficulties in realtime or bidirectional video conference system because future frames are not always known in these realtime systems.

Many videoconference systems operate by capturing video in a compression device, then compressing and transmitting the captured video.

Computer Displays

Videoconference systems often transmit computer display information as compressed video to a remote decompression system. This computer display information may take the form of a remote desktop. The computer display information may include graphics, and may include video in a window.

Specialized products for compression and transmission of an image of part or all of a computer display to at least one other computer system also have been marketed.

Windows Screen Paint

Programs operating under Microsoft Windows typically use screen paint system messages to control refreshing or writing to windows on the display. These WM_PAINT and WM_NCPAINT messages may be passed by the operating system to a program to instruct the program to refresh part or all of its portion of the screen in display memory. Programs may also call procedures for invalidating portions of a screen that in turn cause a WM_PAINT or WM_NCPAINT message to be sent to themselves.

SUMMARY

A computer system operates under a display control system, where screen paint or equivalent messages are used to write messages to portions of a display screen of the computer system. In a particular embodiment, the display control system is a window manager of a windowing system such as Microsoft Windows. The screen is divided into an array of multiple macroblocks.

The screen paint messages are intercepted and decoded to determine altered macroblocks on the display. A changed-blocks table is constructed and marked according to altered macroblocks.

An additional thread reads the changed-blocks table and encodes macroblocks as predicted blocks or initial blocks, depending upon the amount of change, and transmits them to a decode and display system.

Periodically each macroblock in the screen top is marked as changed and requiring an initial block transmission in the changed-blocks table.

The net effect is to transmit an image of the display screen over a low bandwidth line, while supporting display recovery from dropped or corrupted macroblocks.

BRIEF DESCRIPTION OF THE DRAWINGS

FIG. 3 is an illustration of an image on a computer display such as may be encoded and transmitted by the videoconferencing system.

FIG. 4 is a flowchart of actions taken by the system upon intercepting a screen paint message.

FIG. 5 is an illustration of a linked list of macroblock records ordered according to the recency of transmission of each block as an initial block.

FIG. 6 is an illustration of a changed-blocks table.

DETAILED DESCRIPTION OF THE EMBODIMENTS

Figure 1:
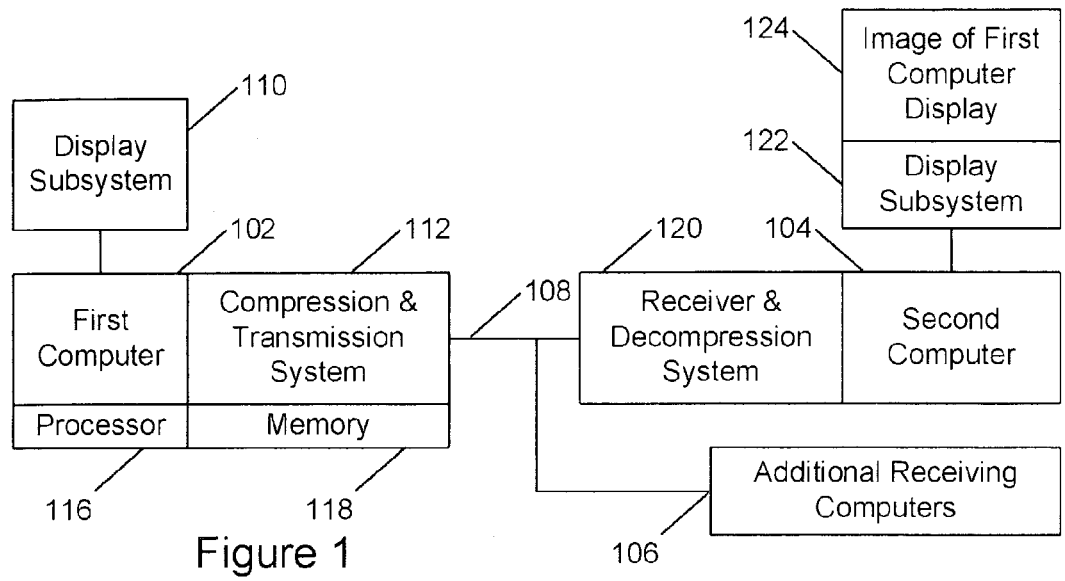
FIG. 1 is a block diagram illustrating a computer-display transmission system

FIG. 1 is an exemplary abbreviated block diagram of a system for transmission of all or part of a computer display image from a first computer 102 to a second 104 and additional receiving 106 computers. Transmission may be over the Internet 108, via modems, or over other forms of digital computer networks. The first computer 102 has a display subsystem 110, as well as a processor 116 for executing software from a memory system 118 connected to the processor 116. Memory system 118 contains RAM memory, cache memory, display memory, and disk memory as known in the art of computer systems, and stores data associated with program execution as well as programs. Memory system 118 includes display memory accessible to the processor 116 of the system whether the display memory be a partition of system main memory, or display memory located on a graphics card as known in the computer art.

Screen images on display subsystem 110 are compressed by compression and transmission subsystem 112 executing on first computer 102, and transmitted to reception and decompression subsystem 120 executing on second computer 104. Second computer 104 thereupon displays received images 124 of the first computers display 110 on its display system 122. In particular embodiment, transmission is by multicast transmission over the Internet, such that additional computers 106 may receive, decompress, and display, the screen images.

Figure 2:
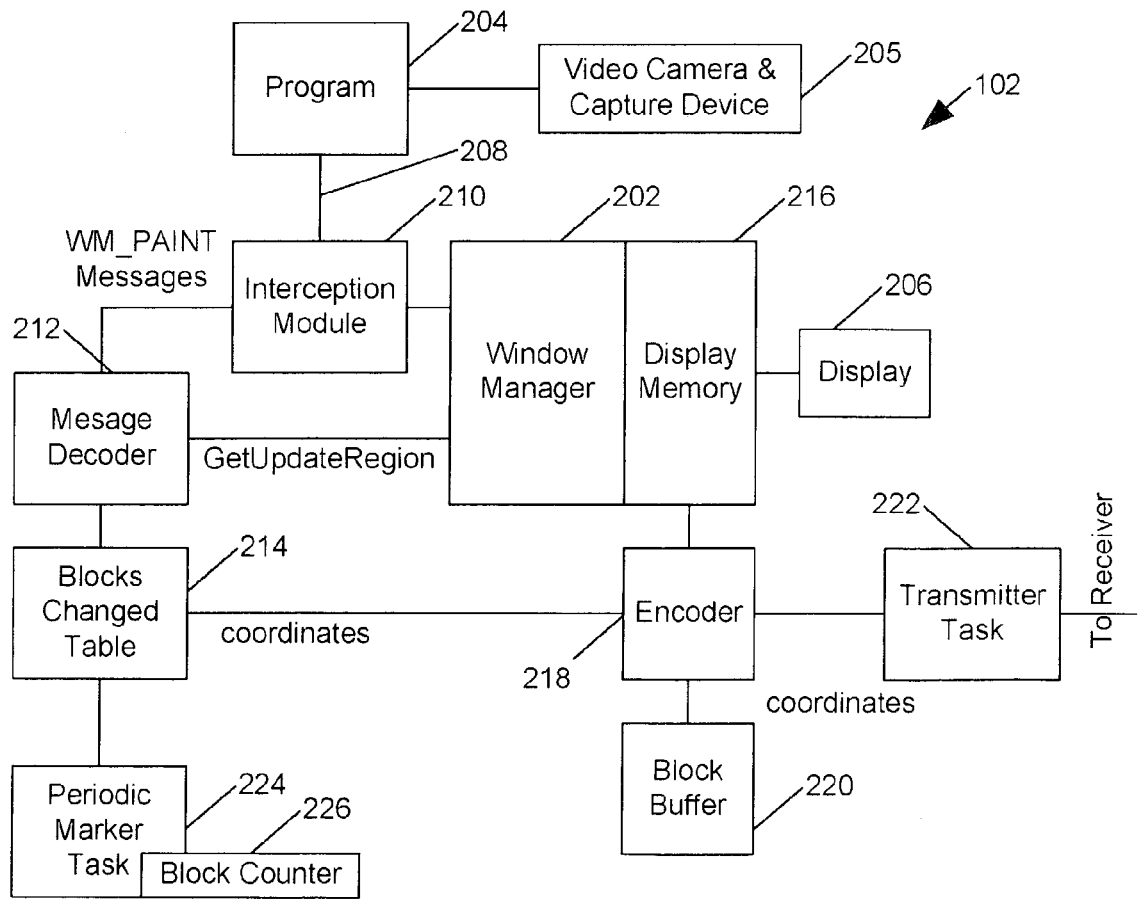
FIG. 2 is an illustrative abbreviated block diagram of a system for transmitting compressed screen images over a network.

FIG. 2 is an illustrative abbreviated block diagram of software and data executing in memory 118 of the first computer 102. The software and data support execution of programs 204 while both displaying screen images locally and transmitting compressed screen images over a network. The first computer system 102 operates under a window manager 202, such as Microsoft Windows or X-Windows where screen paint messages issued by a program 204 are used to write textual, graphical, image, or other data to windows on a display screen 206 of the computer system 102. There may be, and usually are, more than one program 204 executing on computer system 102. Program 204 may receive and display moving or still images from a camera and capture device 205, may generate and/or display graphical images, may be a text or image editor, may be a web browser, or may be another program capable of generating display output.

Each time computer program 204 issues system messages 208 to the window manager 202, the system messages 208 are intercepted, see block 402 of FIG. 4, by an interception module. In an embodiment, interception module 210 is implemented as a dynamic link library (DLL). Messages other than screen paint messages are passed directly to the window manager 202, screen paint messages, including WM_PAINT and WM_NCPAINT messages, are passed to a message decoder 212. Screen paint messages include WM_PAINT and WM_NCPAINT messages when the window manager is a Microsoft Windows window manager.

FIG. 3 illustrates division of an image on a computer display into macroblocks. Message decoder 212 determines, see block 404 of FIG. 4, macroblocks, such as macroblocks 302, 304, that are to be changed by the screen paint message, and marks 406 those macroblocks as changed in an associated macroblock record of a changed blocks table 214. Changed blocks table 214 has a few bits in a macroblock record associated with each macroblock, including a block-changed flag and an initial block required flag. In the present embodiment, macroblocks are sixty-four by sixty-four pixel blocks of the screen image. The screen image comprises a rectilinear array of macroblocks.

The message decoder 212 marks 406 as changed only macroblocks altered by a screen paint message, which may be only a small part of the total macroblocks associated with a window affected by the message. In an embodiment, this is done through a GetUpdateRegion system call to the window manager 202.

The macroblock decoder 212 passes 408 the screen paint messages on to the window manager 202, which updates display memory 216 according to instructions in the screen paint message. In an embodiment, display memory 216 is located in a display adapter as known in the art; in another embodiment display memory 216 is a portion of main memory dedicated to serve as a display buffer and periodically read to display 206 through a direct-memory-access (DMA) channel by a display controller.

Many modern operating systems, including recent versions of Microsoft Windows, are multithreaded operating systems. These systems permit programs to be divided into multiple threads, each thread contains executable code that can be invoked independently of other threads by multitasking management code of the operating system. Typically, code of a thread can share data with other threads of the program.

FIG. 6 details a changed-blocks table 214. An encoder module 218, operating as an additional thread, reads the block-changed flag 604 in macroblock records 602 of the changed-blocks table 214 and encodes changed macroblocks, such as macroblocks 302, 304 as predicted blocks or as compressed initial blocks, depending upon the amount of change and whether an initial-block required flag 606 is present in the associated macroblock record of the changed blocks table 214. Macroblocks having only an initial block required flag 606 are also transmitted as initial blocks. With reference also to FIG. 6, encoder 218 encodes these changed and initial blocks in a compressed image format, and clears the changed block flag 604 and initial block required flag 606 in the associated macroblock record 602 of the changed blocks table 214. In an embodiment, encoder 218 encodes macroblocks in a compressed format as I-blocks or P-blocks. The macroblock is encoded as an I-block if the associated initial block required flag in the changed blocks table 214 is set or if the changed block flag is set and differences from prior transmissions of the macroblock are extensive; otherwise the macroblock is sent as a P-block. P-blocks are encoded by encoding differences between display memory 216 contents and block buffer 220 contents. Block buffer 220 is updated and maintained by encoder 218. Encoded blocks are transmitted to receiving computers 104, 106, by transmitter task 222.

In this embodiment, encoding of macroblocks in compressed form is performed by classifying the macroblock according to the method disclosed in U.S. patent application Ser. No. 09/912,005, entitled "Classification of Features in Compound Documents", filed Jul. 24, 2001, using the edge detection method disclosed in U.S. patent application Ser. No. 09/912,278, entitled "Image Block Classification Based on Entropy of Differences", filed Jul. 24, 2001; the disclosures of which are incorporated herein by reference. Once each macroblock is classified, the macroblock is encoded and compressed with a compression algorithm selected according to the classification of the macroblock, as discussed in U.S. patent application Ser. No. 09/912,005 and whether the macroblock is encoded as an I-block or as a P-block. Among the compression algorithms that may be selected according to the macroblock's classification are compression algorithms known in the art as well as the compression algorithm described in U.S. patent application Ser. No. 10/041,218, entitled "Transform Coefficient Compression Using Multiple Scans," filed Jan. 7, 2002, the disclosure of which is incorporated herein by reference.

Periodically, each macroblock, such as macroblock 306, is marked as changed and requiring an initial block transmission in changed-blocks table 214 by a periodic marker task 224. In an embodiment, the periodic marker task 224 is activated periodically and marks one or a few macroblocks as requiring an initial block transmission each time it is activated. Periodic marker task 224 includes a block counter 226 such that, if there are N macroblocks on the screen, and only one macroblock is marked each invocation, all N macroblocks will be marked in N invocations of the periodic marker task 224. Reception of the macroblock in compressed initial block form permits any receiving system to recover from previous dropped or corrupted transmissions affecting the same macroblock.

In an alternative embodiment, a list of recently-sent macroblocks is maintained, ordered according to when the macroblocks were last transmitted as compressed initial blocks. The list of recently-sent macroblocks is maintained as a doubly-linked list, FIG. 5, of macroblock records 504 each containing a forward link 508, reverse link 510, and a macroblock identifier 512. Each time the periodic marker task 224 is activated, one or several macroblocks are randomly selected from among those having associated macroblock records at the least recently sent end 502 of the list for marking as requiring an initial block transmission; when sent the associated macroblock records 504 are moved to the most recently sent 506 end of the list. With this embodiment, retransmission as initial blocks of those macroblocks that have been recently sent as initial blocks is delayed until after transmission of macroblocks not recently retransmitted. The order of macroblock retransmission as initial blocks is therefore affected by transmission of initial blocks caused by image changes.

In order to avoid unnecessary bursts of transmitted data, the periodic marker 224 only marks a small subset of macroblocks in changed block table 214 as requiring an initial block transmission each time the marker task 224 is invoked. As periodic marker task 224 is reactivated regularly, it will eventually mark all macroblocks as requiring update.

A computer program product is any machine-readable media, such as an EPROM, ROM, RAM, DRAM, disk memory, or tape, having recorded on it computer readable code that, when read by and executed on a computer, instructs that computer to perform a particular function or sequence of functions. The computer readable code of a program product may be part or all of a program, such as a dynamic link library for intercepting screen paint calls. A computer system having memory, the memory containing videoconferencing code, such as a dynamic link library for intercepting screen paint calls and updating a changed-block table according to the heretofore described method, is a computer program product.

While the foregoing has been particularly shown and described with reference to particular embodiments thereof, it will be understood by those skilled in the art that various other changes in the form and details may be made without departing from the spirit and hereof. It is to be understood that various changes may be made in adapting the description to different embodiments without departing from the broader concepts disclosed herein and comprehended by the claims that follow:

What is claimed is:

1. A computer system for executing programs and for displaying and transmitting compressed screen images produced by said programs over a network comprising:

a processor;

a memory system coupled to the processor for storage of the programs and data associated with the programs executing on the processor;

wherein the memory system contains data and program modules comprising:

at least one executing program of the programs;

a window manager coupled to the executing program and to display memory;

the window manager comprising a first message decoder for constructing a screen image in display memory according to screen paint messages passed from the at least one executing program;

an interception module interposed between the window manager and the at least one executing program for intercepting the screen paint messages passed from the executing program to the window manager, the screen paint messages being passed to a second message decoder external to the window manager;

wherein the second message decoder determines display macroblocks of the screen image altered in display memory by the first message decoder upon decoding screen paint messages, and marks said altered macroblocks as changed in a changed blocks table, the second message decoder capable of determining altered macroblocks altered by a message without comparing contents of display memory before and after execution of the message by the first message decoder; and an encoder module for reading the changed blocks table to determine macroblocks that have changed in the display memory since a most recent transmission of the macroblocks, and for encoding said changed macroblocks in a compressed format.

2. The computer system of claim 1 wherein the program modules in the memory system further comprise a periodic marker module for periodically marking macroblocks in the changed blocks table as requiring transmission of an initial block, and wherein the encoder module reads the changed blocks table to determine macroblocks marked in the changed blocks table as requiring transmission of an initial block and encodes said macroblocks marked as requiring transmission of an initial block in a compressed initial block format.

3. The computer system of claim 2, wherein the periodic marker task marks for transmission as initial blocks macroblocks selected from macroblocks that have not recently been transmitted as initial blocks.

4. The computer system of claim 1, wherein the message decoder uses a GetUpdateRegion system call to determine macroblocks altered by a screen paint message.

5. The computer system of claim 4, wherein the screen paint messages are selected from the group of messages consisting of WM_PAINT and WM_NCPAINT messages, and wherein the window manager is a Microsoft Windows system.

6. The computer system of claim 5, wherein the transmission of encoded macroblocks is performed by multicasting over the internet.

7. A computer program product comprising a machine readable media having recorded thereon executable code comprising a set of dynamic link libraries comprising:
 an interception module for intercepting screen paint messages passed from an executing program to a window manager, the intercepted screen paint messages being passed to a message decoder separate from screen painting elements of the window manager;
 a message decoder for determining display macroblocks affected by screen paint messages, and for marking affected macroblocks as changed in a changed blocks table; and
 an encoder module for reading the changed blocks table to determine macroblocks that have changed in display memory since a most recent transmission of those macroblocks, and for encoding changed macroblocks in a compressed-image format.

8. A computer program product comprising a machine readable media having recorded therein computer readable code for:
 a message decoder for determining display macroblocks affected by screen paint messages, and for marking affected macroblocks with an block-changed flag in a macroblock in a changed blocks table, the message decoder separate from display functions of any window manager;
 an interception module for intercepting screen paint messages passed from an executing program to a window manager, the intercepted screen paint messages being passed to the message decoder;
 an encoder module for reading the changed blocks table to determine macroblocks selected from the group consisting of macroblocks that have changed in display memory since last transmitted and macroblocks marked as requiring transmission of an initial block, and for encoding the determined macroblocks in a compressed form; and
 a periodic marker task for periodically marking macroblock records in the changed block table as requiring transmission of an initial block.

9. The computer program product of claim 8, wherein the message decoder contains computer readable code for using a GetUpdateRegion system call to determine macroblocks altered by a screen paint message.

10. The computer program product of claim 9, wherein the screen paint messages are selected from the group consisting of WM_PAINT and WM_NCPAINT messages, and wherein the window manager is a Microsoft Windows system.

11. A method for intercepting screen paint messages and encoding compressed screen images comprising the steps of:
 intercepting screen paint messages being passed from a program to a window manager, the window manager decoding the screen paint messages to create a screen image in a display memory;
 determining macroblocks of a screen image affected by the screen paint messages as changed macroblocks, the step of determining being performed without comparing before and after message images, and being performed by a module separate from the window manager;
 marking the changed macroblocks in a changed-block table;
 encoding macroblocks marked as changed macroblocks in the changed-block table; and
 periodically marking additional macroblocks as changed macroblocks in the changed block table.

12. The method of claim 11, wherein the step of periodically marking additional macroblocks as changed macroblocks marks these additional macroblocks as requiring transmission in initial block form, and wherein the step of encoding macroblocks marked as changed macroblocks selects an encoding for each macroblock from the group consisting of compressed I-blocks and P-blocks.

13. The method of claim 11, wherein the step of periodically marking additional macroblocks as changed macroblocks in the changed blocks table marks macroblocks selected from macroblocks least recently transmitted as initial blocks.

14. A computer system for executing programs and for displaying and transmitting compressed screen images produced by said programs over a network comprising:
 a processor;
 a memory system coupled to the processor for storage of the programs and data associated with the programs executing on the processor;
 wherein the memory system contains data and program modules comprising:
  at least one executing program of the programs;
  a window manager coupled to the executing program and to display memory for constructing screen images in display memory in response to screen paint messages;
  an interception module for intercepting screen paint messages passed from the executing program to the window manager, the screen paint messages being passed to a means separate from the window manager for determining display macroblocks altered by the screen paint messages;
  means for determining display macroblocks altered by the screen paint messages, and for marking altered macroblocks as changed in a changed blocks table;
  means for periodically marking macroblocks in the changed blocks table as requiring transmission of an initial block; and
  means for reading the changed blocks table to determine macroblocks selected from the group consisting of macroblocks that have changed in display memory since a most recent transmission of the macroblock and macroblocks marked as requiring transmission of an initial block, and for encoding the determined macroblocks in a compressed format.

15. A computer system for executing programs and for displaying and transmitting compressed screen images produced by said programs over a network comprising:

a processor;

a memory system coupled to the processor for storage of the programs and data associated with the programs executing on the processor;

wherein the memory system contains data and program modules comprising:

at least one executing program of the programs;

a display manager coupled to the executing program and to display memory for constructing screen images in display memory;

an interception module for intercepting display paint messages passed from the executing program to the display manager, the intercepted display paint messages being passed to a message decoder;

a message decoder separate from the display manager for determining display macroblocks altered by display paint messages, and for marking said altered macroblocks as changed in a changed blocks table the message decoder operable without comparing images constructed by the display manager in the display memory; and an encoder module for reading the changed blocks table to determine macroblocks that have changed in display memory since a most recent transmission of the macroblocks, and for encoding said changed macroblocks in a compressed format.

* * * * *